United States Patent [19]
Chiang

[11] Patent Number: 5,969,245
[45] Date of Patent: Oct. 19, 1999

[54] SCANNER CASING

[75] Inventor: Te-Ming Chiang, Taipei Hsien, Taiwan

[73] Assignee: Primax Electronics Ltd., Taipei Hsien, Taiwan

[21] Appl. No.: 09/071,898

[22] Filed: May 5, 1998

[51] Int. Cl.[6] ................................................ G01D 11/24
[52] U.S. Cl. ................................................................. 73/431
[58] Field of Search ................................. 73/431; 29/446, 29/453; 235/472.01, 462.01, 486; 361/679, 724, 728; 220/780, 793

[56] References Cited

U.S. PATENT DOCUMENTS

| | | |
|---|---|---|
| 5,109,980 | 5/1992 | Matsuoka et al. . |
| 5,233,506 | 8/1993 | Semenik et al. . |
| 5,542,757 | 8/1996 | Chang . |
| 5,581,033 | 12/1996 | Hess .......................................... 73/431 |
| 5,736,638 | 4/1998 | Wang et al. . |
| 5,841,640 | 11/1998 | Shibata . |

*Primary Examiner*—Robert Raevis
*Attorney, Agent, or Firm*—Bacon & Thomas

[57] ABSTRACT

A scanner casing includes a rectangular frame for supporting a transparent platform on which a document to be scanned is placed, and a housing for optical, electronic, and mechanical devices of the scanner. The frame is secured to the housing, without the need for screws, by engagement between respective positioning elements at one end of the frame and housing, and by engagement between respective hook-shaped elements and slots at the other end of the frame and housing.

2 Claims, 2 Drawing Sheets

SCANNER CASING

BACKGROUND OF THE INVENTION

1. Field of the Invention

The present invention relates to an improved scanner casing, and particularly, to an improved scanner casing which does not require screws in assembling the upper housing and the lower housing of the scanner.

2. Description of the Prior Art

A flatbed scanner casing generally includes an upper housing and a lower housing in which the upper housing is a rectangular frame and a transparent platform such made, for example, of glass is usually located over the upper housing by means of adhesive tape, so that an object to be scanned can be placed over the platform for scanning. The lower housing is usually used to accommodate optical, electronic and mechanical devices of the flatbed scanner.

When assembling a traditional flatbed scanner, a plurality of screws are used to bind the upper housing and the lower housing. Furthermore, tools have to be utilized for either assembling or disassembling the casing which can cause inconvenience to operators during the manufacture process.

SUMMARY OF THE INVENTION

It is therefore a primary objective of the present invention to provide an improved scanner casing which uses positioning elements integrally formed on the upper housing and the lower housing, respectively, to assemble the casing.

Briefly, the improved scanner casing according to the present invention includes:

an upper housing on which locating thereon a transparent platform for an object to be scanned may be placed, a first positioning element being integrally formed on a first end of the upper housing and a hook element having a hooking portion being integrally formed on a second end corresponding to the first end;

a lower housing having a first side wall and a second side wall corresponding to the first side wall, a second positioning element being internally provided on the first side wall and a slot being externally provided on the second side wall and extending from the upper edge to the bottom edge of the lower housing;

wherein the upper housing and the lower housing are assembled by engaging the first positioning element of the first end with the second positioning element of the first side wall and the hook element of the second end with the concave portion of the second side wall.

In accordance with one aspect of the present invention, the first positioning element can be an L-shaped member protruding from the first end of the upper housing and the second positioning element can be a member orthonogally protruding from the first side wall.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
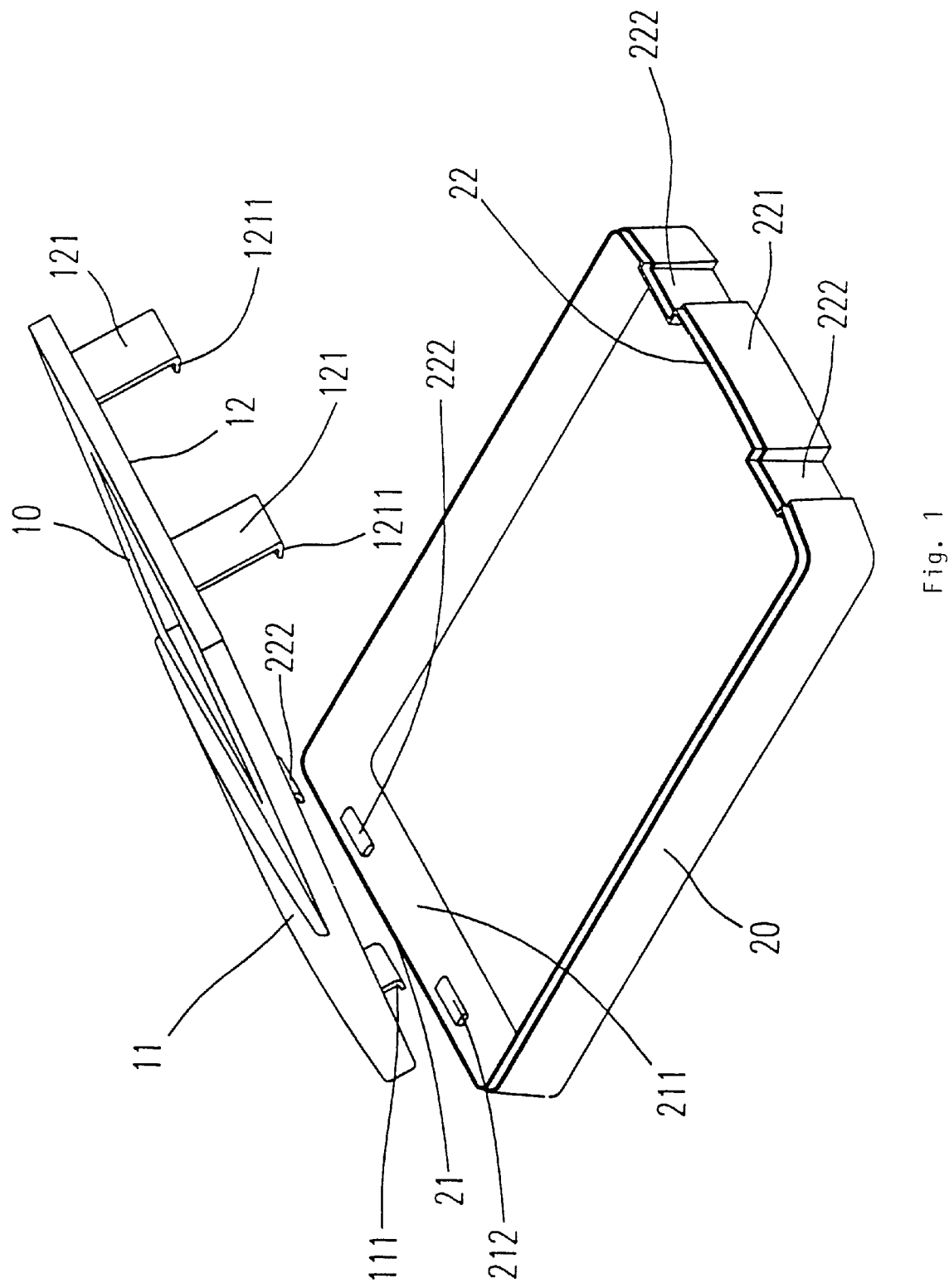
FIG. 1 illustrates a perspective view of an upper housing and a lower housing according to the present invention.
Figure 2:
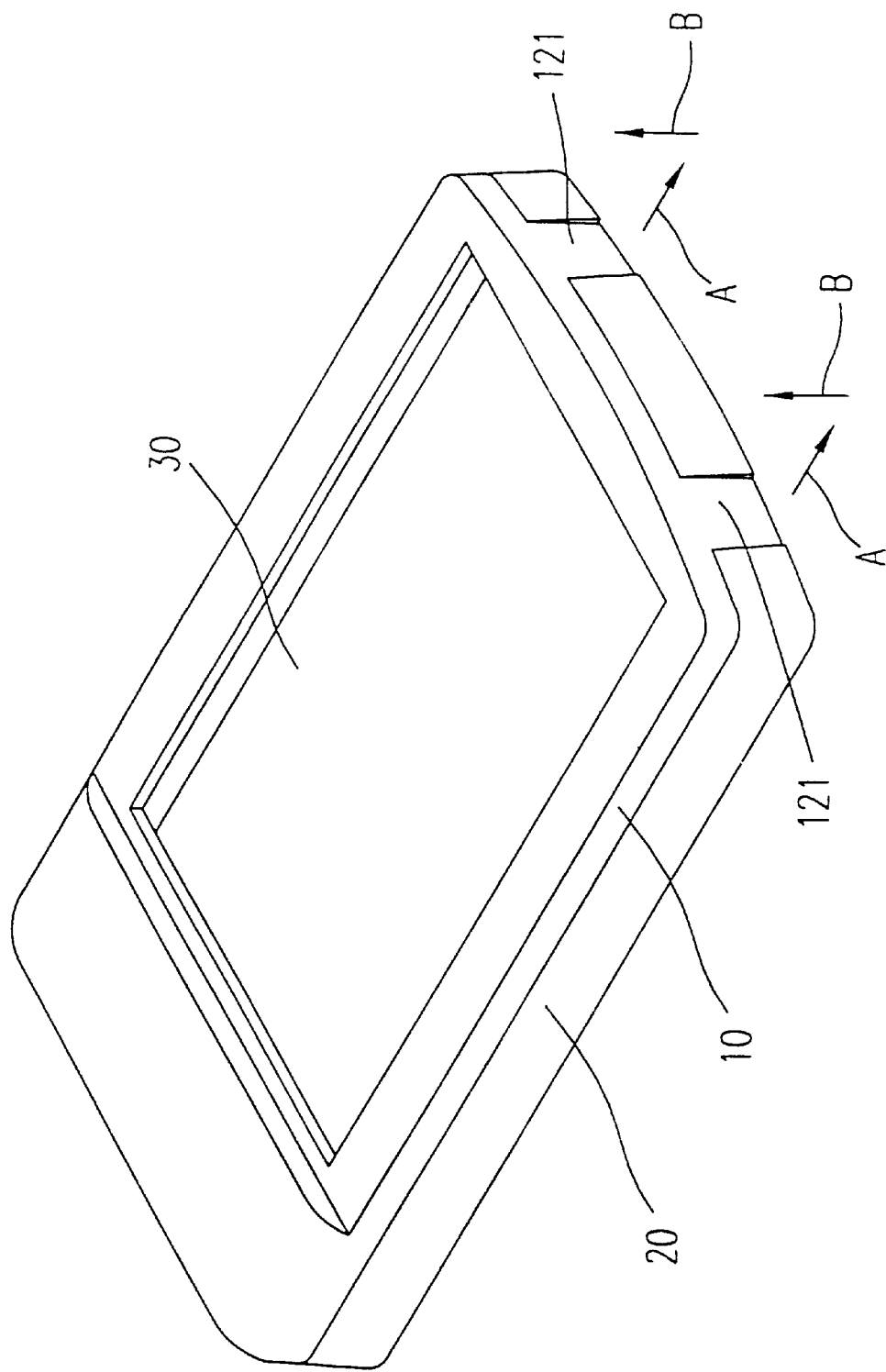
FIG. 2 shows an assembly of the upper housing and the lower housing according to the present invention.

As shown in FIG. 1, which illustrates a perspective view of an upper housing and a lower housing according to the present invention, the preferred scanner casing includes a rectangular upper housing 10. Housing 10 supports a transparent platform on which is placed an object to be scanned. The casing also includes a lower housing 20 for accommodating optical, electronic and mechanical devices of the scanner. The upper housing 10 further includes a first end 11 and a second end 12. A first positioning element 111, which can be an L-shaped member, orthogonally protrudes from the first end 11 and a hook element 121 having a hooking portion 1211 orthogonally protrudes from the second end 12 corresponding to the first end 11. The lower housing 20 further includes a first side wall 21 and a second side wall 22 corresponding to the first side wall 21, while a second positioning element 212, which can be a protruding portion, is provided at the internal surface 211 of the first side wall 21 and a slot 222 is provided at the external surface 221 of the second side wall 22 and extends from the upper edge to the bottom edge of the lower housing 20 as shown in FIG. 2.

The method to assemble the upper housing 10 and the lower housing 20 is detailed below. First, the L-shaped member 111 of the first end 11 is inserted under the protruding portion 212 of the first side wall 21. The upward movement of the L-shaped piece element 111 is thereby prevented so that the first end 11 of the upper housing 10 can be engaged with the first side wall 21 of the lower housing 20. Then, the hook element 121 of the second end 12 is pushed downward along the concave portion 222 of the second side wall 22 to the bottom edge of the lower housing 20 to thereby hook up the second end 12 with the second side wall 22 by using the hooking portion 1211 to hook the bottom edge of the lower housing 20. Because the hook element 121 is made of plastic, the engagement between the upper housing 10 and the lower housing 20 can be secured due to the elastic force of the hooking portion 1211. In the event the upper housing 10 and the lower housing 20 need to be disassembled, one can simply pull out the hooking portion 1211 along the direction A and lift up the hook element 121 along the direct B to disengage the upper housing 10 and the lower housing 20.

The above disclosure is not intended as limiting. Those skilled in the art will readily observe that numerous modifications and alterations of the system may be made while retaining the teachings of the invention. Accordingly, the above disclosure should be construed as limited only by the metes and bounds of the appended claims.

What is claimed is:

1. A scanner casing, comprising:
   an upper housing including
      a transparent platform arranged to support an object to be scanned,
      a first positioning element extending from a first end of said upper housing, and
      a hook element having a hooking portion extending from a second end of said upper housing;
   a lower housing arranged to accommodate scanner optical, electronic, and mechanical devices and including
      a first side wall and a second side wall,
      a second positioning element provided at an internal surface of said first side wall, and
      a slot provided in an external surface of said second side wall and extending from an upper edge to a bottom edge of said housing;
   wherein said upper housing and said lower housing are assembled by engaging said first positioning element with said second positioning element, and said hook element with said slot in said second side wall.

2. The scanner casing of claim 1, wherein said first positioning element is an L-shaped member orthogonally protruding from said first end and said second positioning element is a member orthogonally protruding from said first side wall.

* * * * *